United States Patent [19]

Van Blarigan et al.

[11] 4,358,658
[45] Nov. 9, 1982

[54] LASER WELD JIG

[75] Inventors: Peter Van Blarigan; David L. Haupt, both of Livermore, Calif.

[73] Assignee: The United States of America as represented by the United States Department of Energy, Washington, D.C.

[21] Appl. No.: 213,267

[22] Filed: Dec. 5, 1980

[51] Int. Cl.³ .............................................. B23K 27/00
[52] U.S. Cl. ...................... 219/121 LC; 219/121 LD; 219/121 LY; 219/159
[58] Field of Search ................. 219/121 LC, 121 LD, 219/121 L, 121 LM, 121 LY, 121 EC, 121 ED, 159, 59.1, 64; 228/47, 48

[56] References Cited

U.S. PATENT DOCUMENTS

| | | | |
|---|---|---|---|
| 1,509,507 | 9/1924 | Gruenfeldt | 219/159 |
| 1,550,651 | 8/1925 | Charter | 219/159 X |
| 2,768,281 | 10/1956 | McDaniel | 219/159 |
| 2,798,146 | 7/1957 | November | 219/159 |
| 2,830,170 | 4/1958 | Sillifant et al. | 219/159 |
| 3,349,983 | 10/1967 | Huff | 228/7 |
| 3,517,159 | 6/1970 | Milochevitch | 219/121 LC |
| 3,594,539 | 7/1971 | Geiermann | 219/108 |
| 3,949,186 | 4/1976 | Nakayama et al. | 219/121 LC X |
| 4,088,865 | 5/1978 | Peters et al. | 219/121 LC |
| 4,088,890 | 5/1978 | Waters | 219/121 LC X |

*Primary Examiner*—C. L. Albritton

[57] ABSTRACT

A system is provided for welding a workpiece (10, FIG. 1) along a predetermined weld line (12) that may be of irregular shape, which includes the step of forming a lip (32) on the workpiece to extend parallel to the weld line, and moving the workpiece by engaging the lip between a pair of rotatable members (34, 36). Rotation of one of the members at a constant speed, causes the workpiece to move so that all points on the weld line sequentially pass a fixed point in space (17) at a constant speed, so that a laser welding beam can be directed at that fixed point to form a weld along the weld line. The workpiece can include a reuseable jig (24) forming the lip, and with the jig constructed to detachably hold parts (22, 20) to be welded at a position wherein the weld line of the parts extends parallel to the lip on the jig.

15 Claims, 3 Drawing Figures

LASER WELD JIG

ORIGIN OF THE INVENTION

The Government of the United States of America has rights in this invention pursuant to Department of Energy Contract No. W-7405-ENG-48.

BACKGROUND OF THE INVENTION

In laser beam welding, it is usually necessary to move the welding spot at a nearly constant speed along the weld line, and to maintain the locations being welded at a constant distance from, and normal to, the laser so as to assure that the welding spot is of constant small diameter. While these relatively simple requirements are easily satisfied when the weld line is straight, they can greatly complicate the welding process when the weld line is intricately curved. A method which has been employed to weld along intricately curved weld lines, is to keep both the laser and the workpiece stationary, and to move the laser beam with mirrors. However, the apparatus required to move the welding beam is very expensive. A system which enabled welding along a weld line of a wide variety of configurations, including those which were intricately curved, using a relatively simple mechanism to achieve relative movement of the welding beam to the weld line at a substantially constant speed while maintaining the weld line at a substantially constant distance from the laser or other welding beam source, could significantly lower the cost of intricately welded parts.

OBJECTS AND SUMMARY OF THE INVENTION

One object of the present invention is to provide a relatively simple and inexpensive welding system for performing welds along even intricately curved weld lines.

Another object is to provide a simple welding system for moving a workpiece so that a weld line on the workpiece is moved at a substantially constant speed, so that the weld line is maintained at a substantially constant distance from a welding beam source, and so that the weld line always extends normal to the welding beam source.

Another object is to provide a workpiece which can be moved so that a curved line on the workpiece passes a substantially fixed point in space at a substantially constant speed, using only relatively simple workpiece moving apparatus.

In accordance with one embodiment of the present invention, a welding system is provided which enables the welding of parts along even intricately curved weld lines, utilizing relatively simple apparatus. The system includes an apparatus that can be utilized on a workpiece having a lip portion extending parallel to the weld line, the apparatus including a pair of rotatable members for grasping the lip portion of the workpiece between them, and a means for rotating at least one of the members. As the members rotate, the lip portion of the workpiece, and therefore the parallel weld line, each move past a substantially fixed point in space. A welding beam can be directed at the fixed point past which the weld line moves, to weld the workpiece.

The workpiece can be in the form of a reuseable jig forming the lip portion, and also being formed to detachably hold at least one nonjig part that forms the weld line. The part can be held on the jig, and the lip portion of the jig placed between the rotatable members, to weld the part along its weld line. As an alternative, the lip portion can be formed integrally on a part to be welded, and the lip portion can be left on the part or removed by machining or otherwise after the welding operation has been performed.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
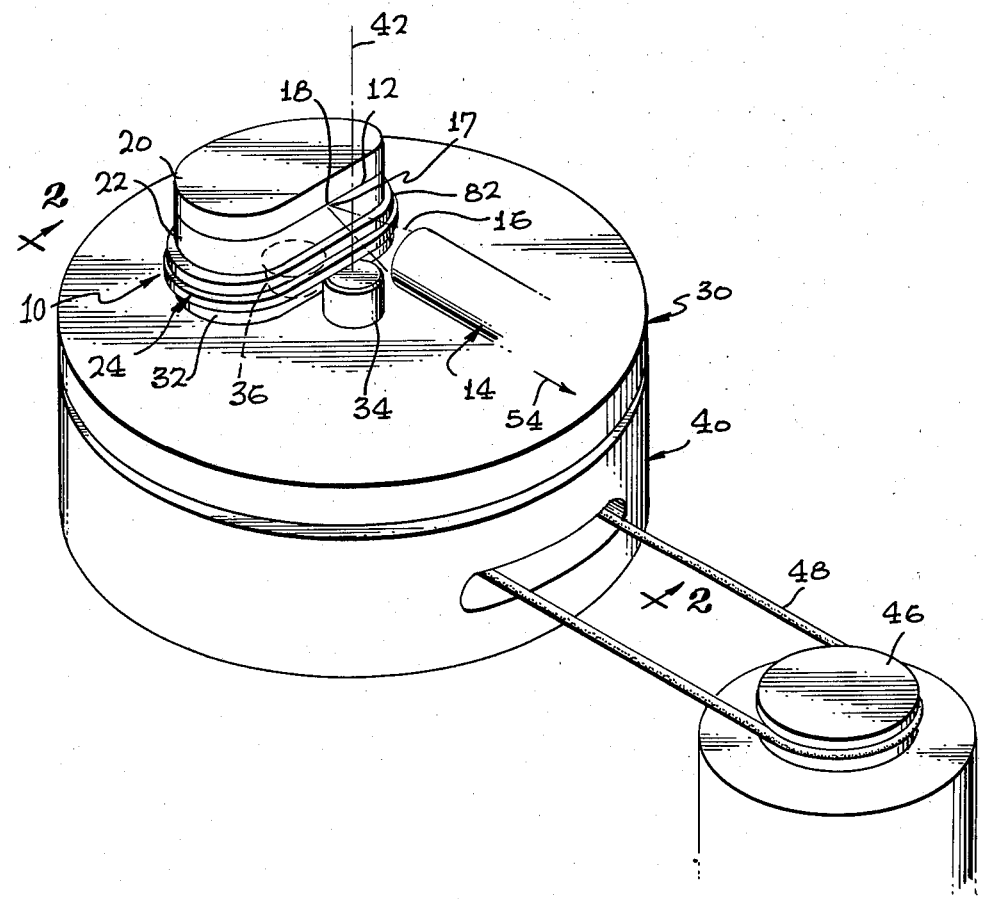
FIG. 1 is a perspective view of a welding system of the present invention.

FIG. 1 illustrates a welding system that enables a workpiece 10 to be welded along a weld line 12 which is intricately but smoothly curved. The welding is performed by a laser beam welding apparatus 14 that concentrates a laser beam 16 onto a small diameter welding spot 18 lying on the weld line 12. In this particular situation, the workpiece 10 includes two parts 20, 22 that have mating surfaces that are to be welded together and that define the weld line 12. The workpiece 10 also includes a jig 24 that supports the two nonjig parts 20, 22 to move them so that points along the weld line 12 move at a constant speed past a fixed point in space 17 at which the concentrated welding spot 18 is located.

An apparatus 30 moves the workpiece 10 by engaging a lip 32 specially formed on the jig of the workpiece for this purpose. The apparatus 30 includes a pair of rotatable members 34, 36 that grasp the lip 32 between them. One of the members 34 is driven to rotate at a constant peripheral speed, while the other member 36 is a backup idler member. The lip 32 is formed so that it extends parallel to the weld line 12, and the laser 14 is positioned so that the weld spot 18 lies adjacent to the location where the lip is grasped between the rotatable members. As a result, during constant rotation of the member 34, points along the weld line 12 move at a constant speed past a point in space 17 where the concentrated weld spot 18 is located. Furthermore, the weld line 12 is always maintained perpendicular to the laser beam. This enables a small diameter welding spot 18 to advance precisely along the weld line 12, to assure that points on the part to be welded move at a constant speed past the spot 18, and to assure that the locations covered by the welding spot 18 are a constant distance and orientation with respect to the stationary welding apparatus 14.

Where a continuous welding seam is to be formed on the parts 20, 22, movement of the welding spot 18 relative to points along the weld line 12, at constant speed and orientation, assures that the same amount of welding energy is applied to every region along the weld line by a welding beam of constant intensity. It is also possible to weld at numerous spaced locations along the weld line by operating the laser intermittently. In either case, the weld line 12 is the locus of the points to be welded. Where the laser beam 16 is to be focused from a large area onto a small spot at 18, the maintenance of the weld location at a constant distance from the laser apparatus 14, and perpendicular to the weld beam, assures that the welding spot 18 will be of constant size. Of course, the apparatus also assures that the constant size welding spot 18 on the part always lies along the weld line 12.

Figure 3:
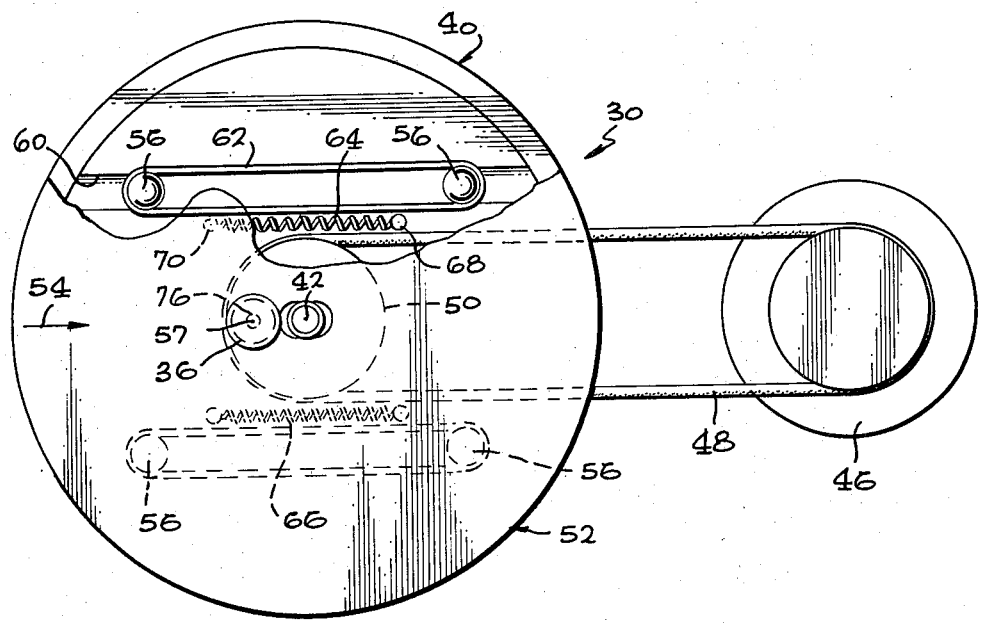
FIG. 3 is a partially sectional plan view of the apparatus of FIG. 2.
Figure 2:
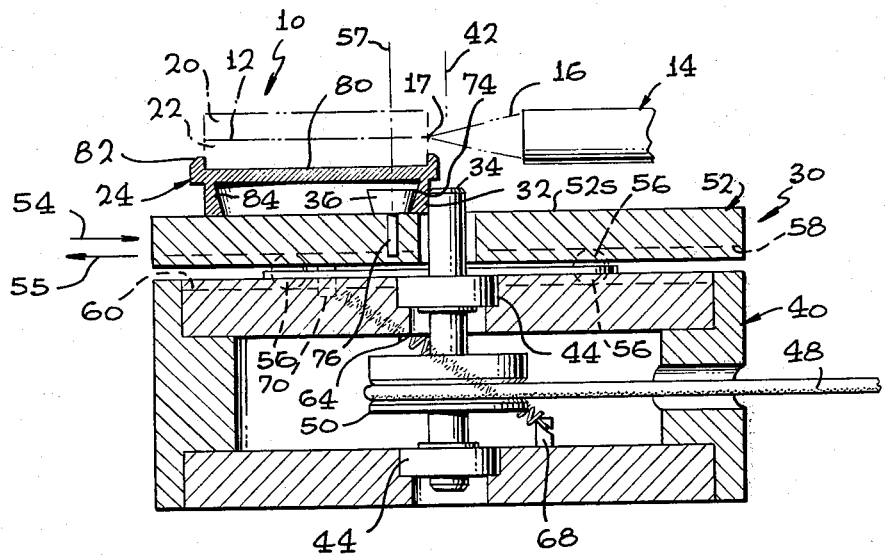
FIG. 2 is a sectional view taken on the line 2—2 of FIG. 1.

As also shown in FIGS. 2 and 3, the driven rotatable member 34 is a shaft rotatably mounted on a frame 40 about a fixed axis of rotation 42 by bearings 44. The shaft is driven by a gear head motor 46 connected through a belt 48 to a pulley 50 on the shaft. The other rotatable member 36 is a tapered idler wheel rotatably mounted on a carriage 52 that lies over the frame 40. The carriage 52 can slide back and forth in the direction of arrows 54, 55, with respect to the frame 40, to shift the axis 57 of the idler wheels. This enables the idler wheel 36 to press the lip 32 on the workpiece securely against the shaft 34, as well as to accommodate small variations in the thickness of the lip 32.

Sliding of the carriage 52 on the frame 40 is accommodated by four balls 56. The balls lie in a pair of grooves 58 formed in the underside of the carriage 52, and in a corresponding pair of grooves 60 formed in the frame 40, a pair of retainers 62 being utilized to prevent loss of the balls. A pair of springs 64, 66 extend between the carriage 52 and the frame 40 to bias the carriage 62 in the direction 54 to urge the idler wheel 36 against the shaft 34. The springs also urge the carriage 52 to press down against the frame. A pair of posts 68 on the frame hold the lower ends of the springs, while a pair of additional posts 70 on the underside of the carriage hold the upper ends of the springs, the springs extending through slots in the upper portion of the frame.

The idler wheel 36 is tapered so that it engages the lip 32 at a location 74 to press the lip securely against the shaft 34. The wheel 36 has bearings within it that rotatably support it on a shaft 76 fixed to the carriage. The movable carriage 52 enables the apparatus to accommodate lips of different thicknesses, or with irregularities in the thickness of the lip, to assure that the workpiece 10 is always securely driven. The idler wheel 36 should have a radius no longer than the smallest inside radius of the jig surface it engages, and it is possible to substitute a small diameter idler wheel where the part to be welded has a somewhat sharp bend.

As described above, the particular workpiece 10 includes a jig 24 designed to support the nonjig parts 20, 22 that are to be welded together. The jig has a platform 80 that supports one of the parts 22, and has a rim 82 that closely confines the part 22 to a fixed orientation with respect to the jig, and therefore with respect to the lip 32 on the jig. For the particular workpiece 10, the bottom perimeter of the part 22 is parallel to the weld line 12, so that the lip 32 can be formed parallel to the rim 82. Also, the weld line 12 lies on a plane, so that the jig 24 can be utilized by forming the bottom of the lip so it lies on a plane parallel to the weld line 12 and can rest directly on the surface of the carriage 52. The idler wheel 36 and the surface of the lip it engages are tapered, so that the idler wheel presses the jig down against the carriage surface 52s. A dry lubricant is applied to the surface 52s to facilitate sliding on it. If the weld line 12 were to vary in height above the bottom of the part 22, then it would be possible to provide a bottom lip surface or other camming surface on the jig on which the jig were supported.

Instead of utilizing a jig 24, it is possible to form a lip integrally with one of the nonjig parts such as 22. After the welding operation, such an integral lip can be left on the part, or can be machined off. While a lip that can be grasped between a pair of rotating members provides a convenient means for moving the workpiece, any surface on the workpiece that extends parallel to a weld line, and that can be engaged by an apparatus to locate different portions of the weld line at a fixed point in space, can be utilized. In the workpiece as shown in FIG. 2, the narrow location 84 on the inside of the lip, against which the shaft 34 presses, serves to fix the location of points along the weld line 12.

An apparatus 30 and workpiece 10 substantially as illustrated in the drawings has been constructed and tested. The system was utilized to join stainless steel parts of the form shown at 20 and 22, which were each of about one inch length. The parts were moved to advance points along the weld line 12 at a speed of two inches per minute, while a laser weld spot 18 of about five mil (thousandth of an inch) diameter was directed at the weld line. The system was found to operate effectively to produce a good weld.

Thus, the invention provides a system for use in working on a workpiece along a narrow band or line that may be of irregular shape, in a process that applies very little force to the workpiece, as in welding along a weld line that may be intricately curved, utilizing relatively simple apparatus. The system includes the forming of an engageable surface extending parallel to the weld line, such as the surfaces of a projecting lip, and the use of an apparatus for engaging the formed surface such as a pair of rotatable members that grasp the lip between them. The apparatus also includes means for moving one of the members that engages the formed surface, such as a motor that turns a rotatable member which is grasping the lip to move the workpiece so that points along the weld line pass a fixed point in space. A welding device is directed at a location on the weld line that lies adjacent to the grasped workpiece location, while a motor can turn one of the rotatable members at a constant speed. As a result, points along the weld line move at a constant speed past a location which is at a constant distance in front of the welding device, to thereby produce a uniform weld along the irregularly-shaped weld line. A welding device that produces a narrow beam, such as an arc or a laser beam, can be applied to the region of the weld line.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. Apparatus for use in welding a workpiece having a lip portion extending parallel to a predetermined weld line, by the use of a welding beam, comprising:
   first and second rotatable members; and
   means for holding peripheral portions of said members together to enable them to grasp a lip portion of the workpiece between them, and for turning at least one of said members, whereby to move the weld line of the workpiece past a location at which a weld beam can be directed.

2. The apparatus described in claim 1 wherein:
   said workpiece includes a reuseable jig forming said lip portion, said jig having means for detachably holding at least one nonjig part forming said weld line in a position wherein the weld line extends parallel to the lip portion of the jig.

3. The apparatus described in claim 1 wherein:
said holding and turning means turns said first member at a constant speed, and including means for directing a welding beam of substantially constant intensity at a predetermined location to intercept said weld line.

4. The apparatus described in claim 1 including:
a frame, and a carriage moveably disposed on said frame; and wherein
said first member includes a shaft rotatable on said frame about a first axis, and said second member includes an idler wheel rotatably mounted on said carriage about a second axis spaced from but substantially parallel to said first axis; and
said holding and turning means includes spring means urging said carriage to move in a direction to bring said axes closer together, and motor means coupled to said shaft to turn it.

5. Apparatus for use in welding a workpiece having a surface extending parallel to a predetermined weld line, by the use of a welding beam, comprising:
a frame;
a member mounted at a substantially fixed location on said frame; and
means for holding said workpiece surface against said member while advancing said workpiece surface at a substantially constant speed past said member, whereby to move the weld line of the workpiece past a fixed location at which a weld beam can be directed;
wherein said workpiece has a lip, with one side of said lip forming said surface, and wherein:
said member is rotatably mounted on said frame, and said member has a periphery that engages said workpiece surface;
said holding means includes a second rotatable member biased against a side of said lip opposite said first member, and means for rotating at least one of said members.

6. A welding system for use with a device that applies welding energy over a small spot, comprising:
a shaft having a workpiece-engaging portion;
means for rotating said shaft;
a workpiece having a multiplicity of points to be welded that lie along a predetermined weld line, and having a lip extending parallel to the weld line; and
a backup wheel rotatably mounted to grasp the lip of the workpiece between the backup wheel and said shaft portion, whereby said lip is driven to move the points to be welded past a fixed location where the spot of welding energy can be applied.

7. The system described in claim 6 wherein:
said welded line lies substantially on an imaginary plane; and including
means forming a flat surface for slideably supporting said lip; and wherein
said lip and backup wheel are tapered, so the backup wheel tends to press the lip against said surface.

8. Apparatus for moving a weldable part that has a lip, comprising:
a frame;
a carriage moveable on said frame and having a face;
a shaft rotatably mounted on said frame and projecting through said carriage so an end of the shaft lies beyond a face of the carriage;
an idler wheel rotatably mounted on said carriage at a position opposite said end of said shaft which lies beyond a face of the carriage;
spring means for urging said carriage to move in a direction to bring said idler wheel close to said shaft; and
means for turning said shaft.

9. The apparatus described in claim 8 including:
a weldable part which includes two portions lying adjacent to one another along a predetermined weld line, and having a lip engageable between said shaft and wheel and extending parallel to said weld line.

10. A weldable apparatus comprising:
a pair of weldable parts having adjacent portions extending parallel to one another to form a weld line, and an elongated lip extending parallel to said weld line and coupled to said parts so that movement of the lip along its length can cause movement of said parts along the length of said weld line,
means for moving said parts parallel to said lip comprising a pair of rotatable members with peripheral portions adjacent to each other to grasp the lip between them, and
means for turning one of said members.

11. The apparatus described in claim 10 including:
a jig, said lip being formed on said jig, and said jig being constructed to hold one of said parts at a predetermined orientation with respect to said lip.

12. A method for welding two workpiece portions together along a predetermined weld line, comprising:
coupling a projecting lip to said workpiece portions, so the lip extends parallel to said weld line; and
engaging said lip and moving it and the workpiece portions coupled thereto along the length of the lip, so that the weld line passes a predetermined stationary location, while directing welding energy at said locations,
said step of engaging said lip including locating it between a pair of rotatable members, rotating the members to advance the lip, and directing said welding energy at a location adjacent to the location where said members engage said lip.

13. A method for welding two workpiece portions together along a predetermined weld line, comprising:
coupling a projecting lip to said workpiece portions, so the lip extends parallel to said weld line,
said step of coupling includes mounting a pair of parts forming said workpiece portions, on a jig which forms said lip, at an orientation wherein the lip extends parallel to the weld line;
engaging said lip and moving it and the workpiece portions coupled thereto along the length of the lip, so that the weld line passes a predetermined stationary location, while directing welding energy at said locations; and
removing the parts from the jig after the portions thereof are welded.

14. The method described in claim 12 wherein:
said step of coupling includes forming said lip integral with one of a pair of parts that form said workpiece portion.

15. The method described in claim 14 including:
removing said lip from the part with which it was integral, after the portions are welded.

* * * * *